(12) United States Patent
Bradish

(10) Patent No.: US 10,499,757 B2
(45) Date of Patent: Dec. 10, 2019

(54) MAILBOX

(71) Applicant: Gregory M Bradish, Greensburg, PA (US)

(72) Inventor: Gregory M Bradish, Greensburg, PA (US)

(*) Notice: Subject to any disclaimer, the term of this patent is extended or adjusted under 35 U.S.C. 154(b) by 153 days.

(21) Appl. No.: 15/849,258

(22) Filed: Dec. 20, 2017

(65) Prior Publication Data

US 2019/0167024 A1    Jun. 6, 2019

Related U.S. Application Data

(60) Provisional application No. 62/437,360, filed on Dec. 21, 2016.

(51) Int. Cl.
*A47G 29/12* (2006.01)
*H04N 7/18* (2006.01)

(52) U.S. Cl.
CPC ....... *A47G 29/1212* (2013.01); *A47G 29/121* (2013.01); *A47G 29/1214* (2013.01); *A47G 2029/12105* (2017.08); *H04N 7/188* (2013.01)

(58) Field of Classification Search
CPC ........ A47G 2029/12105; A47G 29/121; A47G 29/1212; H04N 7/188
See application file for complete search history.

(56) References Cited

U.S. PATENT DOCUMENTS

| | | | | | |
|---|---|---|---|---|---|
| 1,992,640 | A | * | 2/1935 | Steen | A47G 29/1209 232/17 |
| 2,781,964 | A | * | 2/1957 | Ledgerwood | A47G 29/1209 232/17 |
| 3,107,848 | A | * | 10/1963 | Penta | A47G 29/1209 232/17 |
| 3,275,229 | A | * | 9/1966 | Turner | A47G 29/1212 232/34 |
| 3,556,394 | A | * | 1/1971 | Caldes | A47G 29/1212 232/36 |
| 3,611,333 | A | * | 10/1971 | Conigliaro | A47G 29/1214 340/539.14 |
| 4,005,816 | A | * | 2/1977 | Malik | A47G 29/121 232/35 |
| 4,101,877 | A | * | 7/1978 | Rush | A47G 29/1212 235/37 |
| 4,449,663 | A | * | 5/1984 | Schluter | A47G 29/121 232/35 |

(Continued)

*Primary Examiner* — Francis Geroleo
(74) *Attorney, Agent, or Firm* — AP Patents

(57) ABSTRACT

A mailbox comprises an outer shell and an inner shell mounted within a hollow interior of the outer shell, the inner shell defining a hollow interior for receiving mail contents and further defining one or more voids with the outer shell. A door is mounted of a movement to selectively open or close one end of the outer and inner shells. A camera is concealed in one void adjacent the front end, the camera being configured to capture an image in front of the mailbox when the door is moved to at least partially expose the hollow interior for receiving mail contents. A transmitter and a receiver are mounted adjacent the front end to generate an output signal when the mail contents break the light beam therebetween. A flag rotates on the outer shell and actuates a switch to annunciate a presence of the mail contents within the mailbox.

14 Claims, 3 Drawing Sheets

(56) References Cited

U.S. PATENT DOCUMENTS

| | | | | |
|---|---|---|---|---|
| 4,520,350 A * | 5/1985 | Huang | G08B 21/24 | 232/37 |
| 4,728,028 A * | 3/1988 | Barnes | A47G 29/121 | 232/17 |
| 4,794,377 A * | 12/1988 | Benages | A47G 29/1214 | 232/37 |
| 4,868,543 A * | 9/1989 | Binkley | A47G 29/1214 | 340/569 |
| 5,023,595 A * | 6/1991 | Bennett | A47G 29/1214 | 200/61.63 |
| 5,056,711 A * | 10/1991 | Bush | A47G 29/12 | 232/17 |
| 5,060,854 A * | 10/1991 | Armstrong | A47G 29/1214 | 232/37 |
| 5,143,285 A * | 9/1992 | Wise | A47G 29/1216 | 232/17 |
| 5,239,305 A * | 8/1993 | Murphy | A47G 29/1214 | 232/35 |
| 5,255,843 A * | 10/1993 | Deakyne | A47G 29/1212 | 200/330 |
| 5,335,848 A * | 8/1994 | Schreiber | A47G 29/1205 | 232/34 |
| 5,377,906 A * | 1/1995 | Mason | A47G 29/1212 | 232/34 |
| 5,425,501 A * | 6/1995 | Wesorick | A47G 29/1209 | 232/17 |
| 5,449,111 A * | 9/1995 | Sauzedde | A47G 29/1209 | 232/17 |
| 5,695,113 A * | 12/1997 | Rau | A47G 29/1212 | 232/17 |
| 5,954,264 A * | 9/1999 | Keller | A47G 29/1212 | 232/17 |
| 5,979,751 A * | 11/1999 | Maddox | A47G 29/1209 | 232/17 |
| 5,988,495 A * | 11/1999 | Lackey | A47G 29/121 | 232/17 |
| 6,433,684 B1 * | 8/2002 | Lie | A47G 29/1214 | 340/545.6 |
| 6,459,375 B1 * | 10/2002 | Wallace | A47G 29/1214 | 340/569 |
| 6,462,659 B1 | 10/2002 | Schuette | | |
| 6,474,543 B2 * | 11/2002 | Grell | A47G 29/1216 | 232/38 |
| 6,513,706 B1 * | 2/2003 | Kuca | A47G 29/1212 | 232/34 |
| D478,702 S * | 8/2003 | Dregney | D99/29 | |
| 6,629,634 B2 * | 10/2003 | Simmons | A47G 29/1209 | 220/345.4 |
| 6,799,716 B1 * | 10/2004 | Kuelbs | G09F 27/007 | 232/17 |
| 6,831,558 B1 * | 12/2004 | Andrew | A47G 29/1214 | 200/61.61 |
| 6,879,255 B1 * | 4/2005 | Jezierski | A47G 29/1214 | 232/17 |
| 6,923,367 B1 * | 8/2005 | Grossman | A47G 29/1209 | 232/17 |
| 7,025,249 B1 * | 4/2006 | Ledbetter | A47G 29/1214 | 232/34 |
| 7,299,577 B2 * | 11/2007 | Bisson | G09F 13/04 | 40/564 |
| 7,350,692 B2 * | 4/2008 | Bushee | A47G 29/1212 | 232/17 |
| 7,382,252 B2 * | 6/2008 | Brannon | G08B 7/064 | 232/19 |
| 7,786,862 B1 | 8/2010 | Campbell | | |
| 7,843,340 B2 * | 11/2010 | Davis | A47G 29/1214 | 200/61.63 |
| 7,854,374 B2 * | 12/2010 | Dudley | A47G 29/12095 | 232/45 |
| 8,631,998 B1 * | 1/2014 | Connelly | A47G 29/1216 | 232/39 |
| 8,875,987 B2 * | 11/2014 | Supulski | A47G 29/1209 | 232/17 |
| 10,016,083 B1 * | 7/2018 | Atieh | A47G 29/1214 | |
| 2002/0067262 A1 | 6/2002 | Lie | | |
| 2004/0195304 A1 * | 10/2004 | Kujawa | A47G 29/121 | 232/45 |
| 2005/0132624 A1 * | 6/2005 | Gao | G09F 13/22 | 40/544 |
| 2006/0083359 A1 | 4/2006 | Mukunya | | |
| 2006/0104055 A1 * | 5/2006 | Bossomo | A47G 29/1209 | 362/154 |
| 2006/0118609 A1 * | 6/2006 | Iannello | A47G 29/1209 | 232/38 |
| 2006/0191988 A1 * | 8/2006 | Laborde | A47G 29/122 | 232/38 |
| 2008/0290151 A1 * | 11/2008 | Usmani | A47G 29/1212 | 232/35 |
| 2014/0104819 A1 * | 4/2014 | Dowding | F21V 33/0024 | 362/183 |
| 2014/0111333 A1 * | 4/2014 | Haas | G08B 23/00 | 340/539.11 |
| 2015/0016665 A1 | 1/2015 | Tanner | | |
| 2016/0278558 A1 * | 9/2016 | Ansari | H04W 4/12 | |
| 2017/0326598 A1 * | 11/2017 | Chelian | B07C 5/362 | |

* cited by examiner

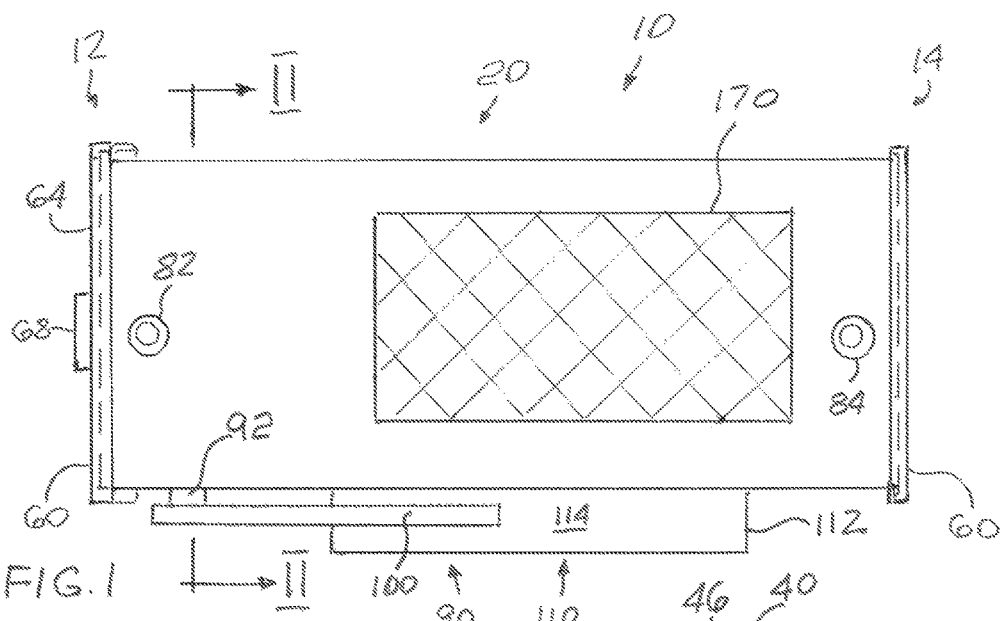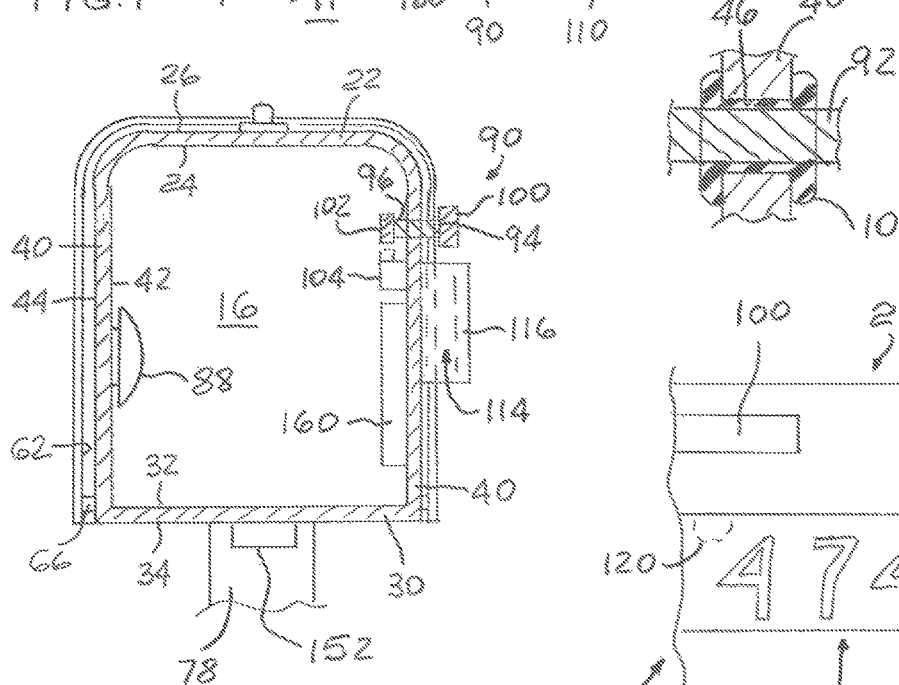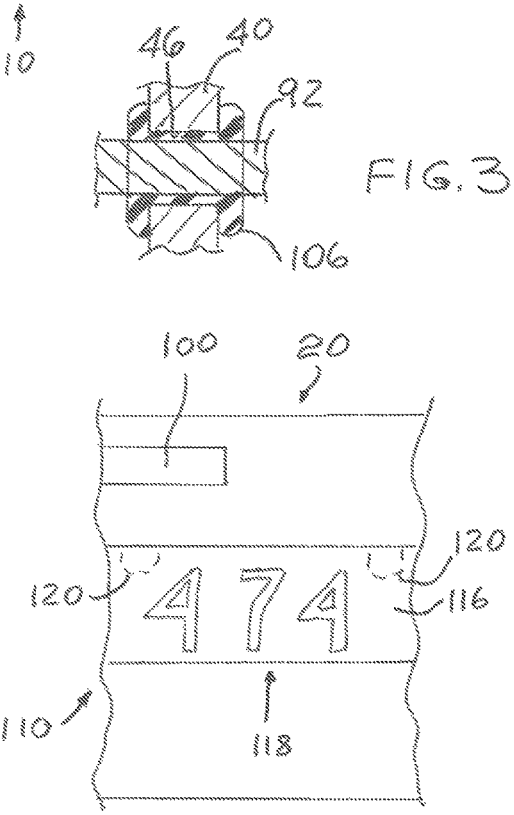

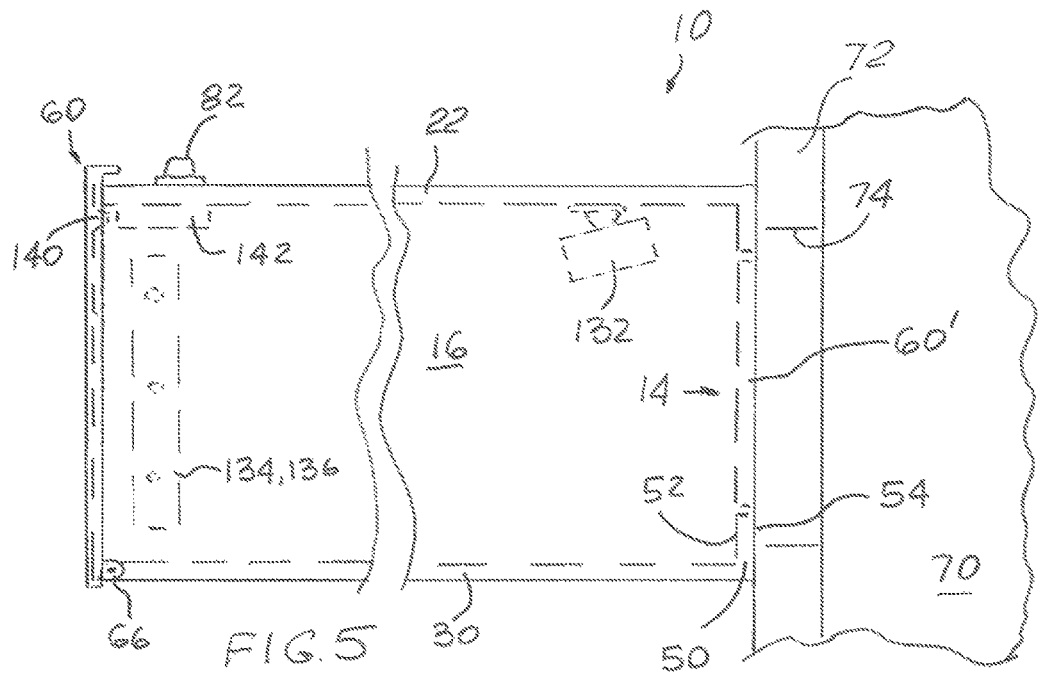
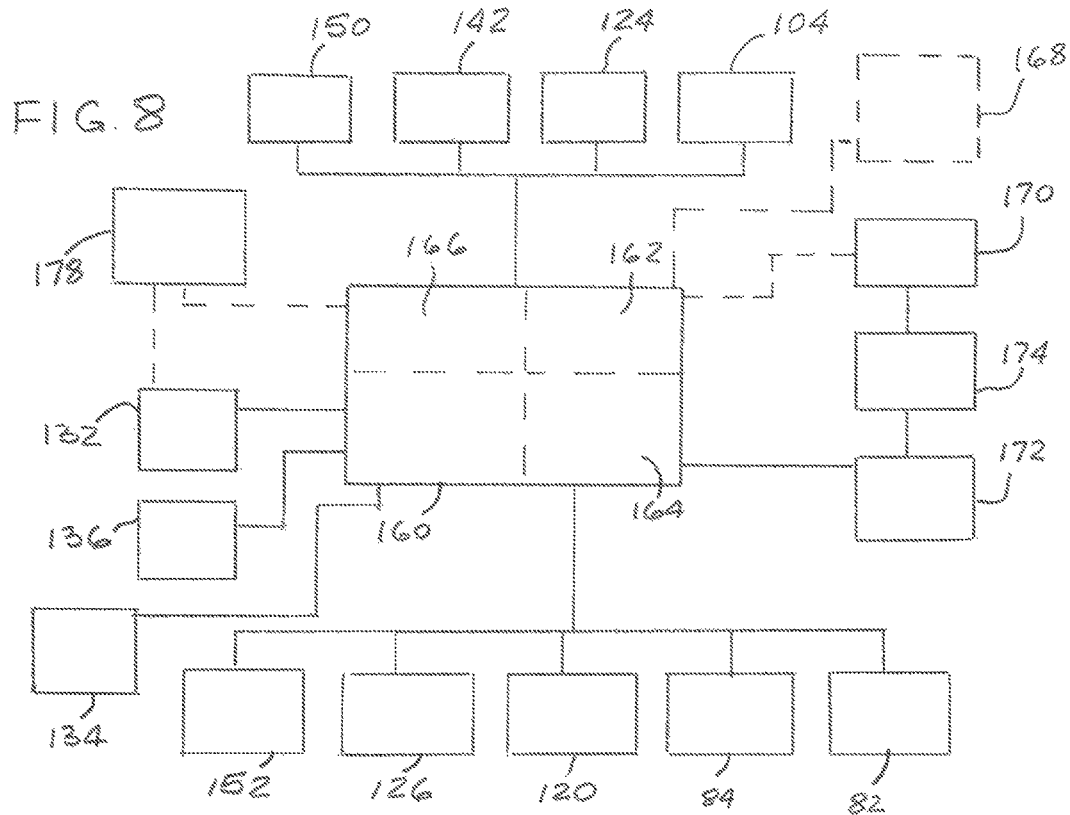

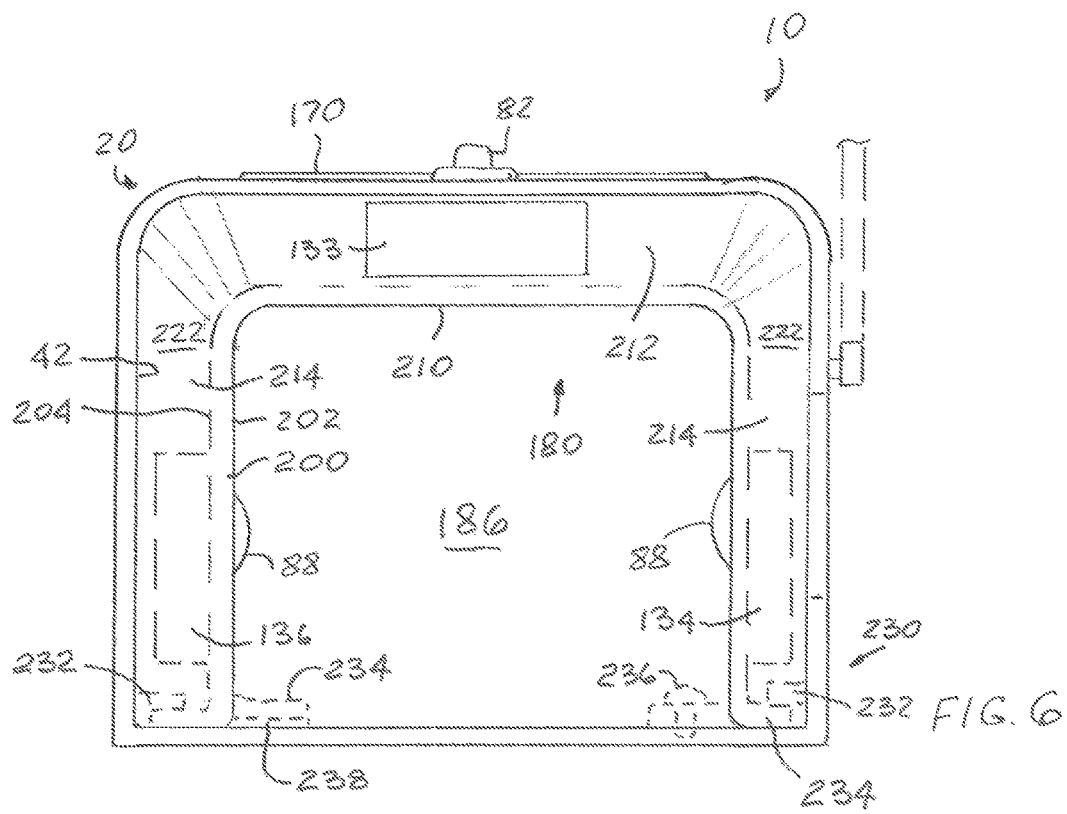
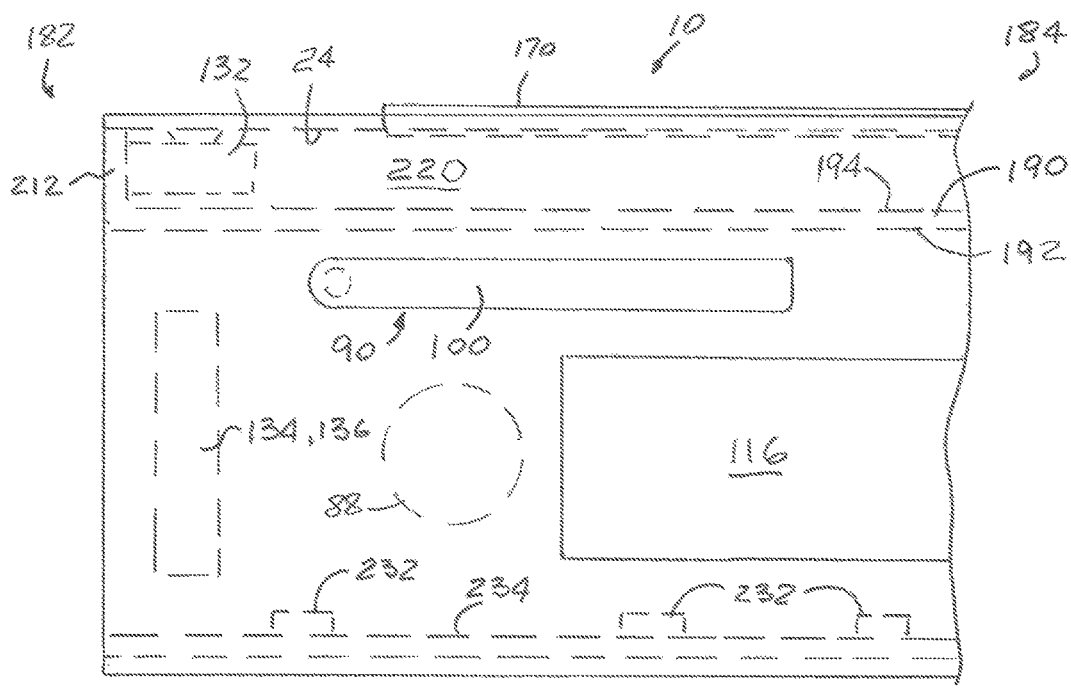

MAILBOX

CROSS-REFERENCE TO RELATED APPLICATIONS

This application is related to and claims priority from and a benefit of U.S. Provisional Patent Application Ser. No. 62/437,360 titled "Mailbox" and filed by Applicant on Dec. 21, 2016, the entire contents of which are hereby incorporated by reference thereto.

STATEMENT REGARDING FEDERALLY SPONSORED RESEARCH AND DEVELOPMENT

N/A

REFERENCE TO SEQUENCE LISTING, A TABLE, OR A COMPUTER PROGRAM LISTING COMPACT DISC APPENDIX

N/A

BACKGROUND

1. Technical Field

The subject matter relates to mailboxes. It further relates to a mailbox equipped with a solar panel, light emitting devices and/or sensors.

2. Description of Related Art

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Mailboxes are generally used by homeowners and business to receive incoming mail and send outgoing mail. Many mailboxes are mounted in rural areas and at a distance from a dwelling where it is difficult or impossible to visually identify presence of incoming mail or absence of the outgoing mail. Some mailboxes may be positioned in locations with insufficient lighting, particularly when dark.

Previously, efforts have been made to annunciate or communicate either a presence of incoming mail or a removal of the outgoing mail by mounting cameras or sensors inside the mailbox.

However, further improvements are desirable in at least protecting such cameras or sensors from damage by the mail contents being placed into or removed from the mailbox, particularly when such mail contents are provided in a form of a box or a parcel.

BRIEF DESCRIPTION OF THE DRAWINGS

The accompanying drawings are incorporated in and constitute part of the specification and illustrate various embodiments. In the drawings:

FIG. 1 illustrates a top view of an exemplary mailbox;

FIG. 2 illustrates a cross-sectional view of the mailbox of FIG. 1 along lines of FIG. 1I-II;

FIG. 3 illustrates a partial cross-sectional view of the mailbox of FIG. 1, particularly illustrating an alternative mounting of a flag shaft;

FIG. 4 illustrates a partial side view of the mailbox of FIG. 1;

FIG. 5 illustrates a partial side view of the mailbox of FIG. 1;

FIG. 6 illustrates an end view of an exemplary mailbox, with a door removed from clarity;

FIG. 7 illustrates a side view of the mailbox of FIG. 6; and

FIG. 8 illustrates an exemplary schematic diagram of a control arrangement of the mailbox of FIGS. 1-7.

DETAILED DESCRIPTION OF EXEMPLARY EMBODIMENTS

Prior to proceeding to the more detailed description of the present invention, it should be noted that, for the sake of clarity and understanding, identical components which have identical functions have been identified with identical reference numerals throughout the several views illustrated in the drawing figures.

The following detailed description is merely exemplary in nature and is not intended to limit the described examples or the application and uses of the described examples. As used herein, the words "example", "exemplary" or "illustrative" means "serving as an example, instance, or illustration." Any implementation described herein as "example", "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

For purposes of description herein, any directional and/or relationary terms such as "upper," "top," "lower," "bottom," "left," "right," "rear," "back," "front," "apex," "vertical," "horizontal," "lateral," "exterior," "interior," and derivatives thereof are relative to each other and are dependent on the specific orientation of an applicable element or article, and are used accordingly to aid in the description of the various embodiments and are not necessarily intended to be construed as limiting.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer, or section from another element, component, region, layer or section. Thus, "a first element," "component," "region," "portion", "layer," or "section" discussed below could be termed a second element, component, region, layer, or section without departing from the teachings herein.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

Furthermore, there is no intention to be bound by any expressed or implied theory presented in the preceding technical field, background, or the following detailed description. It is also to be understood that the specific devices and processes illustrated in the attached drawings, and described in the following specification, are simply examples of the inventive concepts defined in the appended claims. Hence, specific dimensions and other physical characteristics relating to the examples disclosed herein are not to be considered as limiting, unless the claims expressly state otherwise.

The term "or" when used in this specification and the appended claims is not meant to be exclusive; rather the term is inclusive, meaning either or both.

The term "couple" or "coupled" when used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "operatively coupled," as used in this specification and appended claims, refers to a physical connection between identified elements, components, or objects, wherein operation of one of the identified elements, components, or objects, results in operation of another of the identified elements, components, or objects.

The terms "removable", "removably coupled", "removably disposed," "readily removable", "readily detachable", "detachably coupled", "separable," "separably coupled," "releaseably attached", "detachably attached" and similar terms, when used in this specification and appended claims, refer to structures that can be uncoupled, detached, uninstalled, or removed from an adjoining structure with relative ease (i.e., non-destructively, and without a complicated or time-consuming process), and that can also be readily reinstalled, reattached, or coupled to the previously adjoining structure.

The term "generally horizontal(ly)" or "generally vertical (ly)" should be also understood to mean respectively horizontally or vertically disposed element or surface but the term does not exclude the possibility of orienting such feature or surface at a small angle relative to respectively absolute horizontal or vertical plane or line.

It is to be understood that the singular forms "a," "an," and "the" include plural referents unless the context clearly dictates otherwise. Thus, for example, reference to "a component surface" includes reference to one or more of such surfaces.

The particular embodiments of the present disclosure generally provide devices and methods directed to mailboxes equipped with light emitting devices and sensors.

The term "LED" refers to a diode that emits light, whether visible, ultraviolet, or infrared, and whether coherent or incoherent. The term as used herein includes incoherent polymer-encased semiconductor devices marketed as "LEDs", whether of the conventional or super-radiant variety. The term as used herein also includes semiconductor laser diodes and diodes that are not polymer-encased. It also includes LEDs that include a phosphor or nanocrystals to change their spectral output.

The term "mail contents" refers to letters, magazines, flyers, packages, parcels, boxes, etc that are generally delivered by postal or other delivery services.

FIGS. 1-5 illustrate an embodiment of a mailbox 10. The mailbox 10 comprises a housing 20. The housing 20 defines a front end 12, a rear end 14, and a hollow interior 16 of the mailbox 10. The housing 20 comprises a top wall 22 with an interior surface 24 and an exterior surface 26, a bottom wall 30 with an interior surface 32 and an exterior surface 34, a pair of side walls 40, each from the pair of side walls 40 with an interior surface 42 and an exterior surface 44. The housing 20 can also comprises a rear wall 50 with an interior surface 52 and an exterior surface 54. Although the housing has been illustrated as having a curved top wall 22, other shapes are also contemplated herewithin.

As is conventional, the front end 12 is a generally open end and the mailbox 20 further comprises one or a pair of doors 60 mounted for a movement on the housing 20 so as to selectively open and close the front end 12. By way of a non-limiting example, the door 60 can be attached to the side walls 40 with one or more hinges or hinge connections 66, for example being secured to the interior surface 62 of the door 60. As is also conventional, the door 60 has a handle 68 secured to the exterior surface 64 of the door 60.

The rear wall, when provided, defines a generally closed rear end 14 of the mailbox 10. However, the rear end 14 can be an open end, similar to the front end 12, with the mailbox 10 further comprising another door 60 to selectively open and close the open rear end 14, as is best shown in FIG. 1. The second door 60 can be the same as the above described first door 60 or can be constructed similarly to the first door 60, but perhaps being of a different size, as is best illustrated by a door 60' in FIG. 5. The second door 60 allows removal of the contents from the hollow interior 16 or placement of the contents into the hollow interior 16 from the rear of the mailbox 10. The second door 60 is advantageous in an eliminating a need for an owner of the mailbox 10 to step in front of the mailbox 10, which can be stepping on a portion of a heavy traffic street or a roadway. In other words, the second door 60 enhances safety of using the mailbox 10. The second door 60 can be also advantageous when the mailbox 10 is mounted to a wall 72 of a dwelling 70, where the wall 72 has an aperture 74 aligned with the rear end 14. Here, the second door 60 enables the owner of the mailbox 10 to remove the contents from the hollow interior 16 or place the contents into the hollow interior 16 without leaving the dwelling 70.

The mailbox 10 can be configured to upstand above a ground surface, for example by comprising an optional post 78, partially illustrated in FIG. 2, or any other suitable mounting or supporting structure, for example such as a wall 72 of a dwelling 70.

The mailbox 10 can comprise one or more light emitting members. A light emitting member or indicator 82 can be mounted adjacent the front end 12 of the mailbox 10 on or through the top wall 22. A light emitting member or indicator 84 can be mounted adjacent the rear end 14 of the mailbox 10 on or through the top wall 22. Indicators 82 and 84, when lit, are visible from the exterior of the mailbox 10. Furthermore, indicators 82 and 84, when lit, are visible from the upper exterior area or portion of the mailbox 10. Indicators 82 and 84 can be configured as signal lights to identify a presence or an absence of the contents within the hollow interior 16.

Furthermore, the mailbox 10 can comprise one or more optional light emitting members 88 mounted and operable to illuminate the hollow interior 16.

The mailbox 10 comprises a flag 90. The flag 90 can comprise a shaft 92 configured to pass through an aperture 46 in one side wall 40 from the pair of side walls 40. An elongated flag portion 100 is secured to one end 94 of the shaft 92 for a rotation therewith between a first position indicating a presence of mail contents within the hollow interior 16 and a second position indicating an absence of mail contents within the hollow interior 16. A switch actuating portion 102 is secured to an opposite end 96 of the shaft 92 for the rotation therewith. A flag switch 104 is mounted on the interior surface 42 of one side wall 40 from the pair of side walls 40. The flag switch 104 can be a lever actuated limit switch configured to selectively engage the switch actuating portion 102 of the flag 90 when the elongated flag portion 100 is in the first position. The flag switch 104 can be a proximity type switch configured to sense the presence of the switch actuating portion 102 when the elongated flag portion 100 is in the first position. When the flag switch 104 is a lever actuated switch, the lever, which is generally spring-loaded, exerts a force onto the switch actuating portion 102 and aiding in maintaining or positively retaining the elongated flag portion 100 in the first position. Furthermore, when the flag switch 104 is a lever actuated switch, the switch actuating portion 102 is configured as a cam-like portion to selectively engage and disengage the switch lever during rotation of the elongated flag portion between first and second positions. When the flag switch 104 is of a proximity type, the switch actuating portion 102 can be also configured as a cam-like portion or can be configured with any other shape suitable to be sensed or not sensed by the flag switch sensor 104. The flag 90 can be provided in a combination with an optional resilient grommet or sleeve 106 seated in the aperture 46 and encasing the peripheral surface of the shaft 92, as is best illustrated in FIG. 3. The grommet or sleeve 106 is configured to exert friction onto the exterior surface of the shaft 92 not being sufficient to prevent intended manual rotation of the flag 90 but being sufficient to prevent unintended rotation of the elongated flag portion 100. The resilient sleeve 106 is also configured to positively retain the elongated flag portion 100 in the second position. Or, an optional spring (not shown) can be provided to exert force onto the switch actuating portion 102. It would be understood that the lever switch 104, resilient sleeve 106 and the spring (not shown) provide means for positively retaining the elongated flag portion 100 at least in the first position. Stops (not shown) on the exterior surface 44 of the side wall 40 are also contemplated herewithin to control rotation of the elongated flag portion 100. It would be further understood that the indicators 82 and/or 84 can be coupled in series with the flag switch 104 and in a series with a source of electricity. When the elongated flag portion 100 is in the first position, the voltage flows through the (contacts of) flag switch 104, energizing the indicators 82 and/or 84. However, as it will be explained further in this document, the flag switch 104 can be configured to output a flag signal defining the first or the second position of the elongated flag portion 100.

The mailbox 10 can also comprise a lighted panel 110 disposed on the exterior surface 44 one side wall 40 that can be a right wall 40 in FIG. 1. The lighted panel 110 can be configured to display a number of the dwelling, for example by using LEDs. A second lighted panel 110 can be also provided on the opposite side wall 40. The lighted panel 110 can comprise a housing 112 mounted on the exterior surface 44 of the side wall 40. A bezel 116 is disposed in one wall of the housing 112. The bezel 116 carries the indicia 118 to be illuminated by one or more light sources 120. The one or more light sources 120 can be mounted within a hollow interior 114 of the housing 112 and behind a bezel 116 or can be mounted external to the housing 112, for example under a flange (not shown). The light source 120 can be coupled to a light sensor 124 configured to detect ambient light level, i.e. how bright or dark the ambient light is. The light sensor 124 can be a photoresistor, a photodiode, a phototransistor, a phototube, a charge coupled device, or a photovoltaic cell. The light sensor can be mounted anywhere on the exterior surface of the mailbox housing 20 or even be mounted inside the mailbox housing 20 in an alignment with an aperture (not shown) through a thickness of one of the walls. The light source 120 can be also controlled by the optional control unit 160, for example programmed or configured to activate and deactivate the light source 120 based on a time of a day. The light source 120 can be also manually turned ON or OFF, for example by way of an optional switch 126 mounted in series between the light source 120 and the power source, for example such as a remote power source 168 or one or more batteries 172. The panel(s) 110 can be lit during dusk, night, fog, smog conditions and unlit during daylight conditions.

The mailbox 10 can also comprise a means 130 for detecting mail contents placed into the hollow interior 16. In an example, such means 130 can comprise a camera 132 mounted inside the hollow interior 16, for example on the interior surface 24 of the top wall 20 and positioned to capture an image of the contents when triggered.

The camera 132 can be also mounted on the interior surface 52 of the rear wall 50. The camera 132 can be adapted with a WiFi connection to a remote device 178, for example such as any one of a mobile communication device (phone, ipad, tablet), a computer and a cloud environment. The camera 132 can be configured to alert an owner of the mailbox 10 when the contents are placed within the hollow interior 16 by communicating an image of the contents placed within the hollow interior 16 to an owner of such mailbox 10, even when the owner is located remotely. The camera 132 is operable to capture the image of the contents regardless of the nature or importance of such contents. Or the means 130 can comprise a transmitter 134 mounted on the interior surface 42 of one side wall 40 and a receiver 136 mounted on the interior surface 42 of the opposite side wall 40. The transmitter 134 and the receiver 136 can be of an infrared type where the transmitter 134 is configured to emit a beam of light and the receiver 136 is configured to receive the beam of light emitted from the transmitter 134. The transmitter 134 can be continuously ON or can be triggered prior to placements of the contents into the hollow interior 16. In other words, the transmitter 134 can be configured to selectively emit a beam of light and the receiver 136 can be configured to selectively receive the beam of light emitted from the transmitter 134. The receiver 136 can be also configured to output a signal representing a received light condition or a not-received light condition.

In an example, the trigger for the camera 132 and/or the transmitter 134 can comprise a door indicator target 140 mounted on the interior surface 64 of the door 60 and a door indicator switch 142 mounted in a position to sense an absence of the door indicator target 140 when the door 60 is moved to selectively open the open front end 12 of the mailbox 10. The door indicator switch 142 can be a proximity sensor, a reed switch or a limit switch. It would be understood that the door indicator switch 142 can be coupled in series between the camera 132 and/or the transmitter 134 and the power source, for example such as a remote power source 168 or one or more batteries 172. When the door target 140 is moved away from the door indicator switch 142, the voltage will be connected energizing the camera 132 and/or the transmitter 134. The door indicator switch 142 can be also configured to output a door sensing signal to the optional control unit 160.

In an example, the trigger for the camera 132 and/or the transmitter 134 can comprise a motion detection sensor 150, for example of a passive infrared motion sensor type. The motion detection sensor 150 is configured to detect motion in a vicinity of the mailbox 10. The motion detection sensor 150 can also comprise a time delay function to either activate or deactivate the camera 132 and/or the transmitter 134 after a preselected delay that can be adjustable by the owner of the mailbox 10.

The mailbox 10 can also comprise an optional light emitting member 152 coupled to (or being triggered by) the motion detection sensor 150 so as to illuminate at least a ground area around mailbox 10 when motion is detected. Such light emitting member 152 can be mounted on the exterior surface 34 of the bottom wall 30 adjacent the front end 12 of the mailbox 10.

Another optional light emitting member(s) 154 can be mounted within the hollow interior 16 to illuminate such hollow interior 16, for example when the door 60 is moved to open the front end 12. The operation of the light emitting member(s) 154 can be triggered by the above described door indicator switch 142, or by the above described motion detection sensor 150 or even by the flag switch 104.

The above described light emitting devices, switches, sensors, and camera can be arranged so that activation/deactivation of a switch causes action of one or more devices connected thereto. In a non-limiting example, deactivation of the door switch 142 can trigger the camera 132, the transmitter 134, and the receiver 136.

The above described light emitting devices, switches, sensors, and camera can be also coupled to a controller or control unit 160.

The control unit 160 can be positioned within the mailbox 10 and configured to activate and deactivate such devices. A control unit 160 can be positioned remotely and connected to each device within the mailbox 10 with wires or wirelessly, for example with a wireless module or interface 166. The control unit 160 can be a microprocessor based control unit, a programmable logic controller (PLC) or a relay and switch assembly. The control unit 160 can be a computer, a computing device or a mobile communication device containing a programming application configured to operate the above described devices. The mobile communication device can be, without limitations, a cellular phone, a smart phone, a pager, a laptop computer, a notebook or a tablet. Computing device can be, without limitations, a smart phone, a pager, a laptop computer, a notebook or a tablet. In other words, the control unit 160 can be referred to as an electronic controller.

When the control unit 160 is a microprocessor based control unit, a computer or a mobile communication device, it comprises one or more processors 162 and a non-transitory computer readable medium 164 comprising executable instructions that, when executed by the one or more processors 162, cause the one or more processors 162 to perform one or more of the steps of transmitting the image captured by the camera 132 external to the mailbox 10 and/or activating one of the indicators, for example such as the indicator 84 and/or 84; transmitting the flag signal external to the mailbox 10 in a response to receiving the flag signal from the flag switch 104 and/or activating one of the indicators, for example such as the indicator 84 and/or 84; selectively activating the lighted panel 110; and transmitting a received light condition or a not-received light condition external to the mailbox 10 in a response to a received signal from the receiver 136 and/or activating one of the indicators, for example such as the indicator 84 and/or 84.

The control unit 160 and the above described devices can be connected to a variety of power sources. A photovoltaic source or a solar panel 170 can be installed on the mailbox 10, for example on the exterior surface 24 of the top wall 20. The solar panel 170 can be also installed remotely from the mailbox 10 and connected to various devices by way of wires. One or more batteries 172 can be mounted within the hollow interior 16 of the mailbox 10. The one or more batteries 172 can be of a rechargeable type coupled to a charging circuit 174, which is in turn coupled to the photovoltaic source 170. The power source can be the hard wired connection with an external power source 168. The hard wired connection 176 can be routed through the mounting member 78.

The control unit 160 can be also connected to the remote device 178 by way of a wired or a wireless connection through the wireless module or interface 166.

The control unit 160 can be additionally configured with a speaker to emit sound, either of a predetermined tone or communicate voice message from a remote connection. Or a speaker or a sound playing device can be mounted within the mailbox 10 and connected to the control unit 160

The interconnections between various devices on or in mailbox 10 can be disposed on the exterior surface, for example in conduits or disposed on interior surfaces. Now in a reference to FIGS. 6-7, an interior wall 180 can be provided either partially or completely within the hollow interior 16 to provide an inner space 182 for routing any wired connections within the interior of the mailbox 10. However, a wireless control connection is also contemplated, for example with the camera 132.

When inner wall 180 is provided, the housing 20 can be referred to as an outer shell 20 and the inner wall 180 can be referred to as an inner shell 180. The inner shell 180 defines an open front end 182, an open rear end 184, and a hollow interior 186. The hollow interior 186 is then sized and shaped to receive contents therewithin. The inner shell 180 comprises a top wall 190 with an interior surface 192 and an exterior surface 194, a pair of side walls 200, each from the pair of side walls 200 of the inner shell 180 with an interior surface 202 and an exterior surface 204, and a front flange 210. The front flange 210 defining a top portion 212 and a pair of side portions 214. When being disposed within the hollow interior 16, the inner shell 180 defines a first gap or void 220 between the exterior surface 194 of the top wall 190 of inner shell 180 and the interior surface 24 of the top wall 22 of the outer shell 20 and a second gap or void 222 between each exterior surface 204 of one side wall 200 of the inner shell 180 and an interior surface 42 of a respective side wall 40 of the outer shell 20.

There is also a means 230 for mounting the inner shell 180 within the hollow interior 16 of the outer shell 20 so that the front flange 210 covers the first and the second gaps, 220 and 222 respectively, during use of the mailbox 10.

In an example, the means 230 can comprise one or more tabs 232 on one or more interior surface of the outer shell 20 and complimentary one or more tabs 234 (being illustrated in FIG. 7 as a single continuous flange) on the inner shell 180 for a detachable coupling of the inner shell 180 to the outer shell 20. In an example, the means 230 can comprise fasteners, for example such as screws 236 fastening the inwardly disposed one or more tabs 234. In an example, the means 230 can comprise adhesives 238.

When the inner shell 180 is provided, the camera 132 can be advantageously mounted behind the front flange 210, for example behind the top portion 212, and configured to selectively capture an image in front of the mailbox 10. In other words, the top portion 212 can be oriented and the view angle of the camera 132 can be selected to capture an image in front and above the mailbox 10, thus enhancing security of the contents placed into the hollow interior 186. Thus the mailbox 10 can be used as an anti-theft or a theft-deterring mailbox. The anti-theft or a theft-deterring use can be further enhanced with an employment of a remotely-controlled powered lock Furthermore, the first gap 220 and the second gap 222 provide for enclosed or concealed mounting of various devices, for example such as the flag switch 104, the light panel 110, the transmitter 134, the receiver 136, the control unit 160 and the power source. Such enclosed or concealed mounting hides these devices from direct view and eliminates damages by contents, for example such as parcels or boxes, placed into the hollow interior of the mailbox 10. The enclosed or concealed mounting further protects such devices from undesirable weather conditions when the door 60 is moved to open the front end 12 or does not completely close the front end 12.

Regarding the lighted panel 110, the bezel 116 can be integrated into the side wall 40 of the outer shell 20 and the light source 120 can be coupled to the inner surface 42 of the side wall 40, thus eliminating a need for the housing 112. Regarding the transmitter 134 and the receiver 136, the transmitter 134 can be mounted in one side gap or void 222 and the receiver 136 can be mounted in an opposite gap or void 222, each aligned with through aperture(s) in the side walls 200. Each of these devices can be attached either to interior surface of the outer shell 20 or the exterior surface of the inner shell 180.

Any of the above embodiments can be used with or without the solar panel 172.

It is also contemplated that the inner shell 180 can be adapted with a bottom wall being disposed at a distance, for example with spacers or flanges, from the bottom wall 30. Such arrangement facilitates wiring of the optional light emitting member 152 and/or any other devices mounted on the exterior surface 34 of the bottom wall 30. Such arrangement also facilitates mounting transmitter 134 and the receiver 136 to generate a beam of light in a vertical or in a generally vertical direction either alternatively or in addition to the beam of light being generated in a horizontal or in a generally horizontal direction. The inner shell 180 can be also adapted with a rear wall disposed at a distance from the rear wall 50. Such rear wall will be advantageous in mounting at a rear of the mailbox 10 in a position being hidden from direct view.

When the inner shell 180 is adapted with a bottom wall, the front flange 210 can be also adapted with a bottom portion, being generally similar to the top portion 212.

Any of the above described embodiments can be provided as methods of using the mailbox 10 and/or annunciating presence of the contents within the hollow interior 34.

The light emitting device(s) and/or camera provide provides means for annunciating presence of the contents within the mailbox 10. However, annunciation of the contents removed from the mailbox 10 is also contemplated. For example, light emitting devices 82 and/or 84 can be lit when the user places the contents into the hollow interior 16, 186 and are unlit when such contents are removed by a postal service employee. The light emitting devices 82 and/or 84 can be provided at least as a bi-color light emitting devices to change light color when the postal service employee removes the contents or places new contents within the hollow interior 16, 186 to be removed by the user or owner of the mailbox 10.

The light emitting devices 82 and/or 84 can be programmed to flash or be lit intermittently and/or independently from each other to notify postal Service employee that the contents are to be removed from the hollow interior 16, 186. It is also contemplated to combine two or more light emitting devices into a single unit.

The mailbox 10 also provide a means, by way of at least the camera 132, for monitoring authorized removal and/or placement of the contents. The signal and video from the camera 132 can be transmitted upon activation, for example to user's mobile phone, so that the user can at least observe presence of a mail truck, any other authorized vehicle or even a postal employee uniform.

Audible annunciation is also contemplated herewithin, for example at least by way of a speaker mounted on or within the mailbox 10.

The mailbox 10, in accordance with any of the above described embodiments, can be configured for a field replacement of the mailboxes currently in use, particularly with the integral power source and control arrangement.

It would be appreciated from the above disclosure that various methods can be used to annunciate (communicate) presence (or absence) of mail contents in the mailbox 10 to the owner of such mailbox 10 and/or to the postal professional.

In an embodiment, a method of annunciating or communicating a presence or an absence of the mail contents within a hollow interior of the mailbox can comprise the steps of adapting the mailbox with a flag 90, mounting the flag switch 104 on an interior surface of the mailbox 10 in a position so that the flag switch 104 can sense or engage a switch actuating portion 102 of the flag 90 and activating a light emitting member, for example such as the indicator 82 when the flag is raised into a generally vertical first position to indicate presence of the mail contents within the hollow enclosure of the mailbox 10. The method also includes the step of deactivating the indicator 82 when the postal professional removes the mail contents and lowers the flag 90 into a generally horizontal second position. Alternatively, or in addition to activating the indicator 82, the method contemplates communicating a mail presence signal or mail absence signal external to the mailbox 10, for example by coupling the flag switch 104 to the control member 160 and using the control member 160 to transmit, either wirelessly or over a wired connection, the mail presence signal or the mail absence signal in a response to activation or deactivation of the flag switch 104.

In an embodiment, a method of annunciating or communicating a presence or an absence of the mail contents within a hollow interior of the mailbox can comprise the steps of adapting the mailbox with an inner shell 180 to define gaps of voids within the mailbox 10, mounting a transmitter 134 and a receiver 136 within respective voids and adjacent a front end of the mailbox 10 so that the receiver 136 can receive a light beam emitted by the transmitter 134, and activating a light emitting member, for example such as the indicator 82 when the mail contents are being placed into the hollow enclosure of the mailbox 10 by the postal professional. The method also includes the step of selectively activating or deactivating the transmitter 134 and the receiver 136 by detecting opening of the door 60 with the door indicator switch 142 mounted to sense absence of the door indicating target 140 or with the motion detection sensor 150 sensing motion in the vicinity of the mailbox 10.

Alternatively, or in addition to activating the indicator 82, the method contemplates communicating a mail presence signal or mail absence signal external to the mailbox 10, for example by coupling the receiver 136 to the control member 160 and using the control member 160 to transmit, either wirelessly or over a wired connection, the mail presence signal or the mail absence signal in a response to activation of the receiver 136.

In an embodiment, a mailbox comprises an outer shell comprising a top wall with an interior and exterior surfaces, a bottom wall with an interior surface and an exterior surface, a pair of side walls, each from the pair of side walls with an interior surface and an exterior surface and a rear wall with an interior surface and an exterior surface, the outer shell defining a closed rear end, an open front end, and a hollow interior; a door mounted for a movement on the outer shell so as to selectively open and close the open front end of the outer shell; an inner shell comprising a top wall with an interior surface and an exterior surface, a pair of side walls, each from the pair of side walls of the inner shell with an interior surface and an exterior surface, and a front flange, the inner shell defining an open rear end, an open front end, and a hollow interior, the front flange defining a top portion and a pair of side portions; a first gap between the exterior surface of the inner shell and the interior surface of the outer shell; a second gap between each exterior surface of one side wall of the inner shell and an interior surface of a respective side wall of the outer shell; a power source mounted in the first or second gap, the power source comprising a charging circuit; a means for mounting the inner shell within the hollow interior of the outer shell so that the front flange covers the first and the second gaps during use of the mailbox; a flag comprising a shaft configured to pass through an aperture in one side wall from the pair of side walls in the outer shell, an elongated flag portion secured to one end of the shaft for a rotation therewith between a first position indicating a presence of mail contents within the hollow interior of the inner shell and a second position indicating an absence of mail contents within the hollow interior of the inner shell, and a switch actuating portion secured to an opposite end of the shaft for the rotation therewith; a flag switch mounted on an interior surface of the one side wall from the pair of side walls in the outer shell, the flag switch configured to a selectively engage the actuating portion of the flag, the flag switch configured to output a flag signal defining the first or the second position of the elongated flag portion; a camera positioned adjacent a top portion of the front flange and within the first gap and being electrically coupled to the power source, the camera is configured to selectively capture an image in front of the mailbox, when the door is moved to open the open front end of the outer shell, the camera is configured to output a signal containing the captured image; a transmitter mounted in one second gap and being electrically coupled to the power source, the transmitter configured to selectively emit a beam of light;

a receiver mounted in an opposite second gap, the receiver configured to selectively receive the beam of light emitted from the transmitter, the receiver configured to output a signal representing a received light condition or a not-received light condition; a lighted panel mounted on an exterior surface of one side wall from the pair of side walls of the outer shell and being electrically coupled to the power source; a light sensor mounted in a position to sense ambient light and selectively activate and de-activate the lighted panel; a solar panel mounted in the top wall of the outer shell and being electrically coupled to the charging circuit of the power source; a door indicator target mounted on an interior surface of the door; a door indicator switch being electrically coupled to the power source and being mounted in a position to sense the door indicator target when the door is moved to selectively close the open front end of the mailbox and output a signal representing a door closed or a door open position; a motion detection sensor being mounted in a position to detect a motion in a vicinity of the mailbox and output a signal representing the motion; a first indicator being electrically coupled to the power source and being mounted on an exterior surface of the bottom wall, the first indicator being configured to illuminate a ground area in a vicinity of the mailbox; a second indicator being electrically coupled to the power source and being mounted on an exterior surface of one of the top wall, the bottom wall, the side wall and the rear wall of the outer shell, the second indicator being configured to indicate any one of a condition when the door opens or closes the open front end of the mailbox, when the flag is moved into the first position, and when the receiver transmits the signal representing the not-received light condition; a third indicator being electrically coupled to the power source and being mounted in the first or second gap, the third indicator being configured to illuminate the hollow interior of the inner shell when the door is moved to open the open front end; and a controller being electrically coupled to the power source and being mounted in the first or second gap, the controller comprising one or more processors and a non-transitory computer readable medium comprising executable instructions that, when executed by the one or more processors, cause the one or more processors to perform the steps of transmitting the image captured by the camera to a remote device, transmitting the flag signal, in a response to receiving the flag signal from the flag switch, to the remote device, transmitting the received light condition or a not-received light condition, in a response to a received signal from the receiver, to the remote device, activating the first indicator in a response to the signal received from the motion sensor, selectively activating the lighted panel, selectively activating the second indicator when the door is moved to open or close the open front end of the mailbox, when the flag is moved into the first position, and when the receiver transmits the signal representing the not-received light condition, activating the third indicator in a response to a signal from the door indicator switch indicating the door being moved to open the open front end of the mailbox, and controlling operation of the charging circuit.

In one aspect, the means for mounting the inner shell within the hollow interior of the outer shell comprises one or more first tabs on an interior surface of the outer shell and one or more second tabs on the inner shell, the second tabs engaging the first tabs, the first and second tabs being configured to detachably attach the inner shell to the outer shell.

In one aspect, the means for mounting the inner shell within the hollow interior of the outer shell comprises fasteners passed through thickness portion(s) of the inner shell into thickness portion(s) of the outer shell.

In one aspect, the mailbox further comprises the remote device and a connection between the controller and the remote device.

In an embodiment, a mailbox comprises an outer shell comprising a top wall with an interior and exterior surfaces, a bottom wall with an interior surface and an exterior surface, a pair of side walls, each from the pair of side walls with an interior surface and an exterior surface and a rear wall with an interior surface and an exterior surface, the outer shell defining a closed rear end, an open front end, and a hollow interior; a door mounted for a movement on the outer shell so as to selectively open and close the open front end of the outer shell; an inner shell comprising a top wall with an interior surface and an exterior surface, a pair of side walls, each from the pair of side walls of the inner shell with an interior surface and an exterior surface, and a front flange, the inner shell defining an open rear end, an open front end, and a hollow interior, the front flange defining a top portion and a pair of side portions; a first gap between the exterior surface of the inner shell and the interior surface of the outer shell; a second gap between each exterior surface of one side wall of the inner shell and an interior surface of a respective side wall of the outer shell; a power source mounted in the first or second gap, the power source comprising a charging circuit; a means for mounting the inner shell within the hollow interior of the outer shell so that the front flange covers the first and the second gaps during use of the mailbox; a flag comprising a shaft configured to pass through an aperture in one side wall from the pair of side walls in the outer shell, an elongated flag portion secured to one end of the shaft for a rotation therewith between a first position indicating a presence of mail contents within the hollow interior of the inner shell and a second position indicating an absence of mail contents within the hollow interior of the inner shell, and a switch actuating portion secured to an opposite end of the shaft for the rotation therewith; a flag switch mounted on an exterior surface of the one side wall from the pair of side walls in the outer shell, the flag switch configured to selectively engage or sense the actuating portion of the flag, the flag switch configured to output a flag signal defining the first or the second position of the elongated flag portion; a camera positioned adjacent a top portion of the front flange and within the first gap, the camera being electrically coupled to the power source, the camera being configured to selectively capture an image in front of the mailbox, when the door is moved to open the open front end of the outer shell, the camera being configured to output a signal containing the captured image; a transmitter mounted in one second gap and being electrically coupled to the power source, the transmitter configured to selectively emit a beam of light; a receiver mounted in an opposite second gap, the receiver configured to selectively receive the beam of light emitted from the transmitter, the receiver configured to output a signal representing a received light condition or a not-received light condition; and a controller being electrically coupled to the power source and being mounted in the first or second gap, the controller comprising one or more processors and a non-transitory computer readable medium comprising executable instructions that, when executed by the one or more processors, cause the one or more processors to perform the steps of transmitting the image captured by the camera external to the mailbox, transmitting the flag signal external to the mailbox in a response to receiving the flag signal from the flag switch, and transmitting the received light condition or a not-received light condition external to the mailbox in a response to a received signal from the receiver.

In one aspect, the mailbox further comprises a motion detection sensor being mounted in a position to detect a motion in a vicinity of the mailbox and output a signal representing the motion; and an indicator being electrically coupled to the power source and being mounted on an exterior surface of the bottom wall of the outer shell, the indicator being configured to illuminate a ground area in a vicinity of the mailbox.

In an embodiment, a method of annunciating or communicating a presence or an absence of mail contents within a hollow interior of a mailbox comprises the steps of adapting the mailbox with a flag where an elongated flag portion is positioned adjacent an exterior surface of a mailbox housing and rotates on a shaft passed through a thickness of the mailbox housing; mounting a flag switch on an interior surface of the mailbox housing in a position to sense or engage a switch actuating portion on the shaft; and activating a light emitting member when the flag is raised into a generally vertical position to indicate a presence of the mail contents within a hollow enclosure of the mailbox housing.

In an embodiment, a method of annunciating or communicating a presence or an absence of mail contents within a hollow interior of a mailbox comprises the steps of adapting the mailbox with a flag where an elongated flag portion is positioned adjacent an exterior surface of a mailbox housing and rotates on a shaft passed through a thickness of the mailbox housing; mounting a flag switch on an interior surface of the mailbox housing in a position to sense or engage a switch actuating portion on the shaft; coupling the flag switch to a controller; generating, with the flag switch, an output signal when the flag is raised into a generally vertical position to indicate a presence of the mail contents within a hollow enclosure of the mailbox housing; and activating, with the controller in a response to receipt of the output signal, a light emitting member on the exterior surface of the mailbox housing.

In an embodiment, a method of method of annunciating or communicating a presence or an absence of mail contents within a hollow interior of a mailbox comprises the steps of adapting the mailbox with a flag where an elongated flag portion is positioned adjacent an exterior surface of a mailbox housing and rotates on a shaft passed through a thickness of the mailbox housing; mounting a flag switch on an interior surface of the mailbox housing in a position to sense or engage a switch actuating portion on the shaft; coupling the flag switch to a controller; generating, with the flag switch, an output signal when the flag is raised into a generally vertical position to indicate a presence of the mail contents within a hollow enclosure of the mailbox housing and when the flag switch senses or engages the switch actuating portion; and annunciating or communicating the presence of the mail contents, with the controller in a response to receipt of the output signal.

In one aspect, the step of annunciating or communicating the presence of the mail contents comprises a step of activating a light emitting member on the exterior surface of the mailbox housing.

In one aspect, the method further comprises a step of deactivating, with the control unit, the light emitting member when the flag is lowered from the generally vertical position and the flag switch does not sense or does not engages the switch actuating portion.

In one aspect, the step of annunciating or communicating the presence of the mail contents comprises a step of transmitting, by the control unit, the output signal to a remote device.

In one aspect, the method further comprises a step of displaying a message on the remote computer or activating an audible alarm.

In one aspect, the step transmitting the output signal comprises a step of transmitting the output signal over a wired connection or a wireless connection.

In an embodiment, a method of securing mail contents placed into a hollow interior of a mailbox housing comprises the steps of mounting a camera adjacent a front end of the mailbox housing and in a concealed manner; selectively activating the camera based on a predetermined condition; capturing, with the camera, an image in front of the mailbox when a door of the mailbox opened to at least partially expose the hollow interior; and transmitting the captured image to a remote device.

In one aspect, the predetermined condition comprises deactivating a switch mounted to sense a target on an interior surface of the door when the door is in a position to close the open end.

In one aspect, the predetermined condition further comprises outputting, by a receiver, mounted adjacent a front end of the mailbox housing, a signal defining placement of the mail contents into the hollow interior prior to de-activation of the switch.

In one aspect, the predetermined condition comprises detecting, with a motion detection sensor, a motion in a vicinity of the mailbox, receiving an output signal from the motion detection sensor at a control unit and outputting a control signal to the camera from the control unit.

In one aspect, the predetermined condition further comprises raising a flag, mounted on the mailbox housing, into a generally vertical position and activating a flag switch sensing the flag being raised into the generally vertical position prior to detecting the motion with the motion detection sensor.

In one aspect, the method further comprises a step of displaying the captured image on the remote device.

In an embodiment, a mailbox comprises a mailbox housing comprising a hollow interior and an open end; a door mounted for a movement on the mailbox housing to selectively open and close the open end of the mailbox housing; a flag comprising a shaft configured to pass through an aperture in one side wall of the mailbox housing, an elongated flag portion secured to one end of the shaft for a rotation therewith between a first position indicating a presence of mail contents within the hollow interior of the mailbox housing and a second position indicating an absence of mail contents within the hollow interior of the mailbox housing, and a switch actuating portion secured to an opposite end of the shaft for the rotation therewith; a flag switch mounted on an interior surface of the mailbox housing, the flag switch configured to a selectively engage or sense the actuating portion of the flag, the flag switch configured to output a flag signal defining the first position of the elongated flag portion; and an indicator mounted on the mailbox housing in an electrical circuit with the flag switch and in a position to be viewed from a remote location, the indicator being actuated by the flag signal when the flag switch engages or senses the actuating portion of the flag, the electrical circuit being connected to a power source.

In one aspect, the mailbox further comprises a camera mounted in the hollow interior adjacent the open end, the camera being connected to a power source, the camera being configured to capture an image in front of the mailbox when the door is moved to at least partially expose the hollow interior.

In one aspect, the mailbox further comprises a camera mounted in the hollow interior, the camera being connected to a power source, the camera being configured to capture an image of the mails contents being placed into the hollow interior.

In one aspect, the mailbox further comprises a motion detection sensor being mounted in a position to detect a motion in a vicinity of the mailbox and output a signal representing the motion; and an indicator being electrically coupled to the power source and being mounted on an exterior surface of the bottom wall of the outer shell, the indicator being configured to illuminate a ground area in a vicinity of the mailbox.

In one aspect, the mailbox further comprises one or more light emitting members positioned an operable to illuminate the hollow interior of the mailbox housing.

In one aspect, the mailbox further comprises a powered lock to selectively lock or unlock door, a motion detector and a camera (or an additional camera) mounted in a position (for example external to the mailbox) to capture an image even when the door of the mailbox is closed and particularly after the mail contents are placed into the hollow interior of the mailbox, the camera being connected to a power source and so as to provide an owner of the mailbox with means permitting entry into the hollow interior of the mailbox after verifying credentials of the individual tasked with delivering incoming mail contents or picking-up outgoing mail contents from the mailbox. The powered lock can be mounted at a top or side of the mailbox and engage a catch on the inner surface of the door. When the mailbox is adapted with the inner shell, an aperture can be provided in the front flange to accommodate passage of the locking member.

In an embodiment, a mailbox comprises an outer shell; an inner shell mounted within a hollow interior of the outer shell and extending a length of the outer shell between ends thereof, the inner shell defining a hollow interior for receiving mail contents and further defining one or more voids with the outer shell; a door mounted of a movement on the outer shell to selectively open or close one end of the outer shell and the inner shell; a power source mounted ins aid one or more voids; and a camera concealed in the one or more voids adjacent the one end, the camera coupled to the power source and being configured to capture an image in front of the mailbox when the door is moved to at least partially expose the hollow interior for receiving mail contents.

In one aspect, the mailbox further comprises a flag comprising a shaft configured to pass through an aperture in one side wall of the outer shell, an elongated flag portion secured to one end of the shaft for a rotation therewith between a first position indicating a presence of mail contents within the mailbox and a second position indicating an absence of mail contents within the mailbox, and a switch actuating portion secured to an opposite end of the shaft for the rotation therewith; a flag switch mounted on an interior surface of the outer shell in the one or more voids, the flag switch configured to selectively engage or sense the actuating portion of the flag, the flag switch configured to output a flag signal defining the first position of the elongated flag portion; and an indicator mounted on the mailbox housing in an electrical circuit with the flag switch and in a position to be viewed from a remote location, the indicator being actuated by the flag signal when the flag switch engages or senses the actuating portion of the flag, the electrical circuit being connected to the power source.

In one aspect, the one or more voids is a pair of voids, each of the pair of voids disposed adjacent one wall of the outer shell, and wherein the mailbox further comprises a transmitter mounted in one void from the pair of voids and being electrically coupled to the power source, the transmitter configured to selectively emit a beam of light; and a receiver mounted in an opposite void from the pair of voids, the receiver configured to selectively receive the beam of light emitted from the transmitter, the receiver configured to output a signal representing a received light condition or a not-received light condition.

In one aspect, the mailbox further comprises a lighted panel mounted on an exterior surface of the outer shell and being electrically coupled to the power source; and a light sensor mounted in a position to sense ambient light and selectively activate and de-activate the lighted panel.

In one aspect, the mailbox further comprises a solar panel mounted on the outer shell and being electrically coupled to a charging circuit of the power source.

The chosen exemplary embodiments of the subject matter have been described and illustrated, to plan and/or cross section illustrations that are schematic illustrations of idealized embodiments, for practical purposes so as to enable any person skilled in the art to which it pertains to make and use the same. As such, variations from the shapes of the illustrations as a result, for example, of manufacturing techniques and/or tolerances, are to be expected. It is therefore intended that all matters in the foregoing description and shown in the accompanying drawings be interpreted as illustrative and not in a limiting sense. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims. It will be understood that variations, modifications, equivalents and substitutions for components of the specifically described exemplary embodiments of the invention may be made by those skilled in the art without departing from the spirit and scope of the invention as set forth in the appended claims.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

It should be appreciated that reference throughout this specification to "an embodiment" means that a particular feature, structure or characteristic described in connection with the embodiment is included in at least one embodiment of the present invention. Therefore, it is emphasized and should be appreciated that two or more references to "an embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure, aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

Any element in a claim that does not explicitly state "means for" performing a specified function, or "step for" performing a specified function, is not to be interpreted as a "means" or "step" clause as specified in 35 U.S.C. § 112, ¶ 6. In particular, any use of "step of" in the claims is not intended to invoke the provision of 35 U.S.C. § 112, ¶ 6.

Anywhere the term "comprising" is used, embodiments and components "consisting essentially of" and "consisting of" are expressly disclosed and described herein."

Furthermore, the Abstract is not intended to be limiting as to the scope of the claimed invention and is for the purpose of quickly determining the nature of the claimed invention.

What is claim is:
1. A mailbox, comprising:
an outer shell comprising a top wall with an interior and exterior surfaces, a bottom wall with an interior surface and an exterior surface, a pair of side walls, each from said pair of side walls with an interior surface and an exterior surface and a rear wall with an interior surface and an exterior surface, said outer shell defining a closed rear end, an open front end, and a hollow interior;
a door mounted for a movement on said outer shell so as to selectively open and close said open front end of said outer shell;
an inner shell comprising a top wall with an interior surface and an exterior surface, a pair of side walls, each from said pair of side walls of said inner shell with an interior surface and an exterior surface, and a front flange, said inner shell defining an open rear end, an open front end, and a hollow interior of said inner shell, said front flange defining a top portion and a pair of side portions;
a first gap between said exterior surface of said inner shell and said interior surface of said outer shell;
a second gap between each exterior surface of one side wall of said inner shell and an interior surface of a respective side wall of said outer shell;
a power source mounted in said first or second gap, said power source comprising a charging circuit;

a means for mounting said inner shell within said hollow interior of said outer shell so that said front flange covers said first and said second gaps during use of said mailbox;
a flag comprising:
   a shaft configured to pass through an aperture in one side wall from said pair of side walls in said outer shell,
   an elongated flag portion secured to one end of said shaft for a rotation therewith between a first position indicating a presence of mail contents within said hollow interior of said inner shell and a second position indicating an absence of mail contents within said hollow interior of said inner shell, and a switch actuating portion secured to an opposite end of
   said shaft for said rotation therewith;
a flag switch mounted on an interior surface of said one side wall from said pair of side walls in said outer shell, said flag switch configured to selectively engage said actuating portion of said flag, said flag switch configured to output a flag signal defining said first position or said second position of said elongated flag portion;
a camera positioned adjacent a top portion of said front flange and within said first gap and being electrically coupled to said power source, said camera is configured to selectively capture an image in front of said mailbox, when said door is moved to open said open front end of said outer shell, said camera is configured to output a signal containing said captured image;
a transmitter mounted in one second gap and being electrically coupled to said power source, said transmitter configured to selectively emit a beam of light;
a receiver mounted in an opposite second gap, said receiver configured to selectively receive said beam of light emitted from said transmitter, said receiver configured to output a signal representing a received light condition or a not-received light condition;
a lighted panel mounted on an exterior surface of one side wall from said pair of side walls of said outer shell and being electrically coupled to said power source;
a light sensor mounted in a position to sense ambient light and selectively activate and de-activate said lighted panel;
a solar panel mounted in said top wall of said outer shell and being electrically coupled to said charging circuit of said power source;
a door indicator target mounted on an interior surface of said door;
a door indicator switch being electrically coupled to said power source and being mounted in a position to sense said door indicator target when said door is moved to selectively close said open front end of said mailbox and output a signal representing a door closed or a door open position;
a motion detection sensor being mounted in a position to detect a motion in a vicinity of said mailbox and output a signal representing said motion;
a first indicator being electrically coupled to said power source and being mounted on an exterior surface of said bottom wall, said first indicator being configured to illuminate a ground area in a vicinity of said mailbox;
a second indicator being electrically coupled to said power source and being mounted on an exterior surface of one of said top wall, said bottom wall, said side wall and said rear wall of said outer shell, said second indicator being configured to indicate any one of a condition when said door opens or closes said open front end of said mailbox, when said flag is moved into said first position, and when said receiver transmits said signal representing said not-received light condition;
a third indicator being electrically coupled to said power source and being mounted in said first or second gap, said third indicator being configured to illuminate said hollow interior of said inner shell when said door is moved to open said open front end; and
a controller being electrically coupled to said power source and being mounted in said first or second gap, said controller comprising one or more processors and a non-transitory computer readable medium comprising executable instructions that, when executed by said one or more processors, cause said one or more processors to perform the steps of:
   transmitting said image captured by said camera to a remote device,
   transmitting said flag signal, in a response to receiving said flag signal from said flag switch, to the remote device,
   transmitting said received light condition or a not-received light condition, in a response to a received signal from said receiver, to the remote device,
   activating said first indicator in a response to said signal received from said motion detection sensor,
   selectively activating said lighted panel,
   selectively activating said second indicator when said door is moved to open or close said open front end of said mailbox, when said flag is moved into said first position, or when said receiver transmits said signal representing said not-received light condition, and
   activating said third indicator in a response to a signal from said door indicator switch indicating said door being moved to open said open front end of said mailbox.

2. The mailbox of claim 1, wherein said means for mounting said inner shell within said hollow interior of said outer shell comprises one or more first tabs on an interior surface of said outer shell and one or more second tabs on said inner shell, said second tabs engaging said first tabs, said first and second tabs being configured to detachably attach said inner shell to said outer shell.

3. The mailbox of claim 1, wherein said means for mounting said inner shell within said hollow interior of said outer shell comprises fasteners passed through thickness portion(s) of said inner shell into thickness portion(s) of said outer shell.

4. The mailbox of claim 1, further comprising said remote device and a connection between said controller and said remote device.

5. A mailbox, comprising:
   an outer shell comprising a top wall with an interior and exterior surfaces, a bottom wall with an interior surface and an exterior surface, a pair of side walls, each from said pair of side walls with an interior surface and an exterior surface and a rear wall with an interior surface and an exterior surface, said outer shell defining a closed rear end, an open front end, and a hollow interior;
   a door mounted for a movement on said outer shell so as to selectively open and close said open front end of said outer shell;
   an inner shell comprising a top wall with an interior surface and an exterior surface, a pair of side walls, each from said pair of side walls of said inner shell with an interior surface and an exterior surface, and a front flange, said inner shell defining an open rear end, an open front end, and a hollow interior of said inner shell, said front flange defining a top portion and a pair of side portions;

a first gap between said exterior surface of said inner shell and said interior surface of said outer shell;

a second gap between each exterior surface of one side wall of said inner shell and an interior surface of a respective side wall of said outer shell;

a power source mounted in said first or second gap, said power source comprising a charging circuit;

a means for mounting said inner shell within said hollow interior of said outer shell so that said front flange covers said first and said second gaps during use of said mailbox;

a flag comprising:
  a shaft configured to pass through an aperture in one side wall from said pair of side walls in said outer shell,
  an elongated flag portion secured to one end of said shaft for a rotation therewith between a first position indicating a presence of mail contents within said hollow interior of said inner shell and a second position indicating an absence of mail contents within said hollow interior of said inner shell, and
  a switch actuating portion secured to an opposite end of said shaft for said rotation therewith;

a flag switch mounted on an exterior surface of said one side wall from said pair of side walls in said outer shell, said flag switch configured to selectively engage or sense said actuating portion of said flag, said flag switch configured to output a flag signal defining said first position or said second position of said elongated flag portion;

a camera positioned adjacent a top portion of said front flange and within said first gap, said camera being electrically coupled to said power source, said camera being configured to selectively capture an image in front of said mailbox, when said door is moved to open said open front end of said outer shell, said camera being configured to output a signal containing said captured image;

a transmitter mounted in one second gap and being electrically coupled to said power source, said transmitter configured to selectively emit a beam of light;

a receiver mounted in an opposite second gap, said receiver configured to selectively receive said beam of light emitted from said transmitter, said receiver configured to output a signal representing a received light condition or a not-received light condition; and a controller being electrically coupled to said power source and being mounted in said first or second gap, said controller comprising one or more processors and a non-transitory computer readable medium comprising executable instructions that, when executed by said one or more processors, cause said one or more processors to perform the steps of:
  transmitting said image captured by said camera external to said mailbox,
  transmitting said flag signal external to said mailbox in a response to receiving said flag signal from said flag switch, and
  transmitting said received light condition or a not-received light condition external to said mailbox in a response to a received signal from said receiver.

6. The mailbox of claim 5, further comprising a motion detection sensor being mounted in a position to detect a motion in a vicinity of said mailbox and output a signal representing said motion; and an indicator being electrically coupled to said power source and being mounted on an exterior surface of said bottom wall of said outer shell, said indicator being configured to illuminate a ground area in a vicinity of said mailbox.

7. A mailbox, comprising:
  a mailbox housing comprising a hollow interior and an open end;
  an inner shell mounted within said hollow interior of said mailbox housing and extending a length of said mailbox housing between ends thereof, said inner shell defining another hollow interior of said mailbox housing configured to receive mail contents and further configured to define one or more voids with said mailbox housing;
  a door mounted for a movement on said mailbox housing to selectively open and close said open end of said mailbox housing;
  a flag comprising:
    a shaft configured to pass through an aperture in one side wall of said mailbox housing,
    an elongated flag portion secured to one end of said shaft for a rotation therewith between a first position indicating a presence of mail contents within said another hollow interior of said mailbox housing and a second position indicating an absence of mail contents within said another hollow interior of said mailbox housing, and
    a switch actuating portion secured to an opposite end of said shaft for said rotation therewith;
  a flag switch mounted on an interior surface of said mailbox housing, said flag switch configured to a selectively engage or sense said actuating portion of said flag, said flag switch configured to output a flag signal defining said first position of said elongated flag portion;
  an indicator mounted on said mailbox housing in an electrical circuit with said flag switch and in a position to be viewed from a remote location, said indicator being actuated by said flag signal when said flag switch engages or senses said actuating portion of said flag, said electrical circuit being connected to a power source; and
  a camera concealed in said one or more voids adjacent said open end of said mailbox housing, said camera coupled to the power source and being configured to capture an image in front of said mailbox when said door is moved to at least partially expose said another hollow interior configured to receive the mail contents.

8. The mailbox of claim 7, further comprising a camera mounted in said another hollow interior, said camera being connected to a power source, said camera being configured to capture an image of the mail contents being placed into said hollow interior.

9. The mailbox of claim 7, further comprising:
  a motion detection sensor being mounted in a position to detect a motion in a vicinity of said mailbox and output a signal representing said motion; and
  an indicator being electrically coupled to the power source and being mounted on an exterior surface of said bottom wall of said mailbox housing, said indicator being configured to illuminate a ground area in a vicinity of said mailbox.

10. The mailbox of claim 7, further comprising one or more light emitting members positioned and operable to illuminate said hollow interior of said mailbox housing.

11. The mailbox of claim 7, further comprising said power source being mounted in said one or more voids.

12. The mailbox of claim 7, wherein said one or more voids is a pair of voids, each of said pair of voids disposed adjacent one wall of said mailbox housing, and wherein said mailbox further comprising:
- a transmitter mounted in one void from said pair of voids and being electrically coupled to said power source, said transmitter configured to selectively emit a beam of light; and
- a receiver mounted in an opposite void from said pair of voids, said receiver configured to selectively receive said beam of light emitted from said transmitter, said receiver configured to output a signal representing a received light condition or a not-received light condition.

13. The mailbox of claim 7, further comprising:
- a lighted panel mounted on an exterior surface of said mailbox housing or at least partially within a side wall of said mailbox housing and being electrically coupled to the power source; and
- a light sensor mounted in a position to sense ambient light and selectively activate and de-activate said lighted panel.

14. The mailbox of claim 7, further comprising a solar panel mounted on said mailbox housing and being electrically coupled to a charging circuit of the power source.

* * * * *